April 28, 1964 W. O. COLLINS 3,131,111

HALO CONSTRUCTION FOR RELIGIOUS STATUES

Filed Nov. 13, 1959

William O. Collins
INVENTOR.

BY Clarence A. O'Brien
and Harvey B. Jacobson
Attorneys

United States Patent Office 3,131,111

Patented Apr. 28, 1964

3,131,111

HALO CONSTRUCTION FOR RELIGIOUS STATUES

William O. Collins, 5715 California Ave., Falls Church, Va.

Filed Nov. 13, 1959, Ser. No. 852,675
1 Claim. (Cl. 161—8)

The present invention generally relates to a religious statue and more particularly to a novel structure of a disk that will simulate a halo for enhancing the appearance of the statue and providing a religious authenticity thereto while at the same time increasing the beauty of the statue and the meditative responses for which said statues are often used.

Various types of religious statues are employed for many different purposes and quite often, it is desired to provide a halo in relation to the religious figures. There have been provided many halos or representations of halos on statues and usually include some material disposed in a circular ring and fixed to the head of the statue. Generally, such devices have been extremely fragile and, at best, do not provide a true halo effect. Therefore, it is the primary object of the present invention to provide a simple plastic disk readily attached to the statue which plastic disk provides an edge lighting effect which will simulate a halo ring.

The disk is constructed from that group of plastics known as fluorescent plastics in which light impinging on the flat surfaces of the disk will be emitted around the edge of the disk. An example of such plastic material is the material "Plexiglas" manufactured by Rohm and Haas.

Another object of the present invention is to provide a halo disk in accordance with the preceding object in which the disk is readily and securely attached to the religious statue.

A further important feature of the present invention is to provide a halo disk which may be attached to a statue or incorporated into a flat type of structure, that is, disposed in a vertical plane with the edge lighting being accomplished by a beveled peripheral edge.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
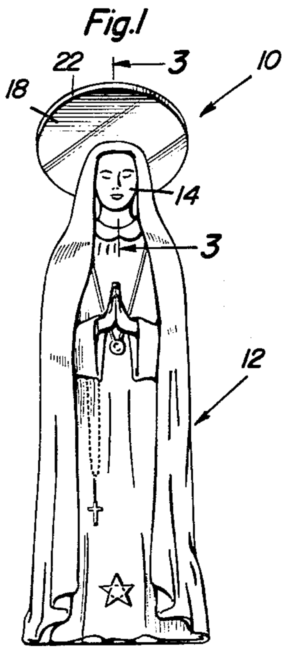
FIGURE 1 is a front view of the statue incorporating the halo disk of the present invention therein.
Figure 2:
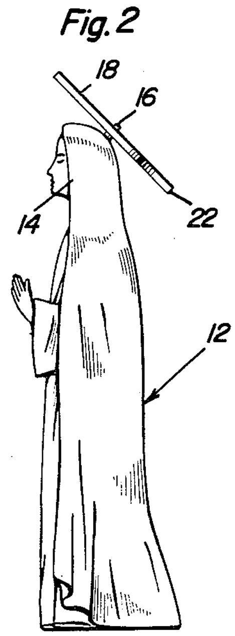
FIGURE 2 is a side elevational view of the construction of FIGURE 1.
Figure 5:
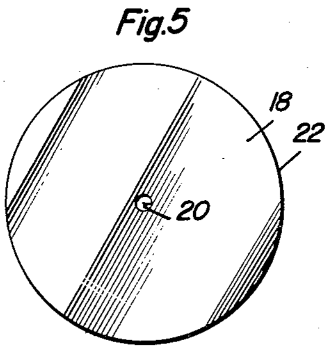
FIGURE 5 is a plan view of the halo disk.

Referring now specifically to the drawings, the halo construction generally is designated by the numeral 10 and is mounted in inclined relation to a statue of a religious nature generally designated by the numeral 12. As will be noted, the statue 12 will be an accurate and proportional statue of a religious figure and may include various arrangements and configurations including a head 14 to which is attached the halo disk 10.

Figures 3, 4:
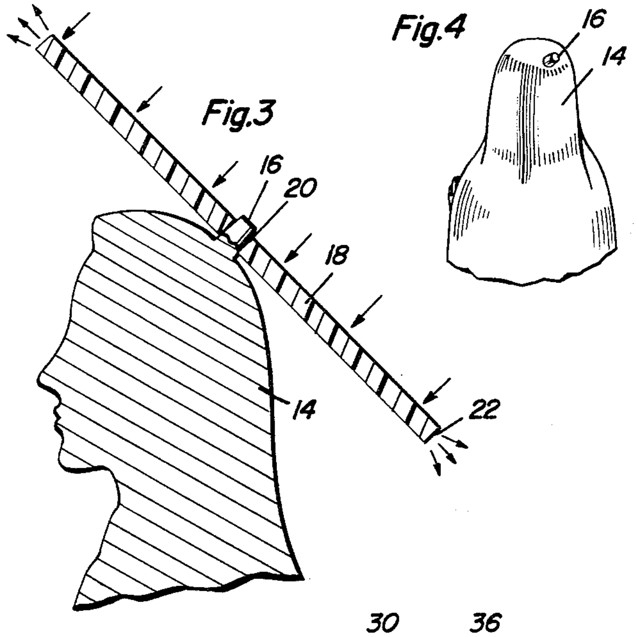
FIGURE 3 is a detailed sectional view, on an enlarged scale, taken substantially upon a plane passing along section line 3—3 of FIGURE 1 illustrating the structural details and relationships of the halo disk and statue with the arrows indicating the passage of light through the disk.
FIGURE 4 is a fragmentary rear perspective view of the statue illustrating the projection thereon which receives the halo disk.

As illustrated in FIGURES 3 and 4, the head 14 is provided with an upwardly and rearwardly inclined projection 16 generally in the form of a pin which is tapered outwardly and which is disposed at a 45° angle to the horizontal or to the vertical plane when the statue 12 is disposed in the normal position.

The halo disk 10 includes a circular disk of fluorescent edge lighted plastic 18 having a centrally disposed aperture 20 therein for frictional engagement with the projecting pin 16. Thus, the plastic disk 18 may be assembled onto the projection or pin 16 by merely bringing the aperture 20 into frictional engagement with the tapered surface of the pin 16. The upper and lower surfaces of the disk 18 are flat and parallel and the peripheral surface 22 is perpendicular to the flat surfaces of the disk 18. Thus, as light rays engage the flat surfaces of the disk 18, they will be emitted from the peripheral edge 22 due to the fact that the disk 18 is constructed of a fluorescent plastic which has the property of edge lighting. In view of the inclined relation of the disk 18, the peripheral edge 22 will be viewed regardless of the orientation of the viewer in relation to the statue since the peripheral edge 22 will provide an effective halo effect to the statue thereby enhancing the appearance of the statue and increasing the religious authenticity as well as enhancing the beauty and religious responses normally conducted in conjunction with such a statue.

Figure 6:
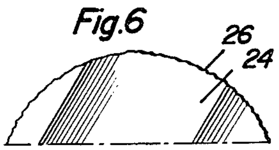
FIGURE 6 is a partial plan view of a slightly modified form of halo disk incorporating serrated or roughened edges for enhancing the halo effect.

FIGURE 6 illustrates a slightly modified form of the invention in which the disk 24 is provided with a roughened or serrated peripheral edge 26 which will enhance the halo effect of the statue.

Figure 7:
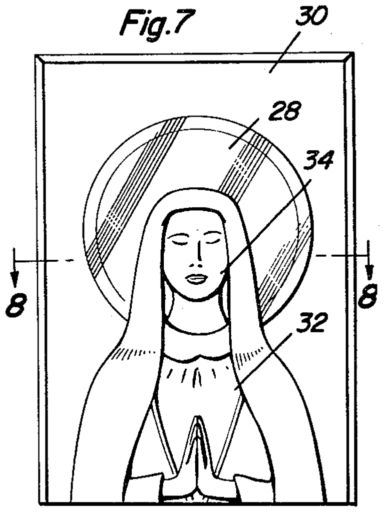
FIGURE 7 is a front view of a modified form of the invention in which the halo disk is employed in a plaque type of construction.
Figure 8:
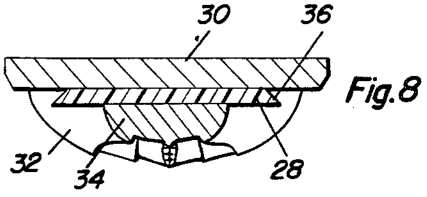
FIGURE 8 is a transverse, sectional view taken substantially upon a plane passing along section line 8—8 of FIGURE 7 illustrating the bevel provided on the peripheral edge of the disk.

FIGURES 7 and 8 illustrate another form of the invention in which the halo disk 28 is provided and is disposed against and is secured to the front surface of a plaque 30 having a statue 32 or a partial statue 32 disposed against the front surface thereof with the head 34 being disposed forwardly of the disk 28 and disposed against the front surface of the disk 28. The disk 28 is provided with a beveled peripheral surface 36 which has the smaller diameter disposed against the front surface of the plaque 30 and the larger diameter disposed outwardly thereof whereby the halo effect will be produced by the bevel 36 which is preferably at a 45° angle which again will produce the halo effect in the form of a peripheral ring of lighting due to the edge lighting characteristics of the disk of fluorescent plastic and also produce an illumination effect due to the disk of plastic itself.

Of course, the entire device is quite simple in construction and very inexpensive but yet the device materially enhances the religious statue from both an appearance and religious aspect.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A religious statue comprising a miniature statue including a simulated head and a thin circular disk mounted on said head for producing a halo effect in adjacent relation to the simulated head, said disk being solid and provided with smooth parallel transparent surfaces having a peripheral edge orientated in angular relation to the normal line of sight of a person observing the statue, said disk being constructed of methyl methacrylate and transmitting a substantial portion of light impinging on the smooth surfaces to the peripheral edge thereby emitting light from the peripheral edge thereby producing a peripheral glow simulating a halo, said disk also being illuminated by light impinging thereon thereby forming a soft glow over the surface of the disk with a more intense peripheral edge glow, said disk being provided with a centrally disposed aperture, said simulated head having a rearwardly and upwardly inclined projecting pin received in said aperture, said pin tapering outwardly and frictionally engaging the periphery of the aperture thereby securely retaining the disk in position when engaged with the pin.

References Cited in the file of this patent

UNITED STATES PATENTS

| | | |
|---|---|---|
| D. 99,909 | Waterman | June 2, 1936 |
| D. 114,854 | Wojtalewicz | May 16, 1939 |
| D. 132,193 | Murphy | Apr. 28, 1942 |
| D. 176,719 | Haddox | Jan. 24, 1956 |
| 2,347,681 | Goudreau | May 2, 1944 |
| 2,354,367 | Ford | July 25, 1944 |
| 2,493,991 | Morrison | Jan. 10, 1950 |

FOREIGN PATENTS

| | | |
|---|---|---|
| 970,020 | France | June 7, 1950 |

OTHER REFERENCES

Modern Plastics, August 1952, p. 53.

Plastics that Glow in the Dark, Modern Plastics, October 1948, pp. 88–91.

Luminescent Pigments, reprint from 1947 Modern Plastics, publ. by Plastics Catalogue Corp., 122 E. 42 St., N.Y., N.Y., pp. 203–206.